United States Patent
Jonasson et al.

(10) Patent No.: US 10,967,874 B2
(45) Date of Patent: Apr. 6, 2021

(54) METHOD AND SYSTEM FOR CONTROLLING A VEHICLE TIRE-TO-ROAD FRICTION ESTIMATION

(71) Applicant: Volvo Car Corporation, Gothenburg (SE)

(72) Inventors: Mats Jonasson, Partille (SE); Mattias Brannstrom, Gothenburg (SE); Rickard Nilsson, Hisings Kärra (SE)

(73) Assignee: Volvo Car Corporation, Gothenburg (SE)

( * ) Notice: Subject to any disclaimer, the term of this patent is extended or adjusted under 35 U.S.C. 154(b) by 26 days.

(21) Appl. No.: 16/176,303

(22) Filed: Oct. 31, 2018

(65) Prior Publication Data
US 2019/0126933 A1 May 2, 2019

(30) Foreign Application Priority Data
Nov. 1, 2017 (EP) .................................... 17199502

(51) Int. Cl.
*B60W 40/105* (2012.01)
*B60W 10/184* (2012.01)
(Continued)

(52) U.S. Cl.
CPC ....... *B60W 40/105* (2013.01); *B60K 31/0066* (2013.01); *B60K 31/18* (2013.01);
(Continued)

(58) Field of Classification Search
CPC ............. B60W 40/105; B60W 30/146; B60W 2552/20; B60W 2552/30; B60W 2552/40;
(Continued)

(56) References Cited

U.S. PATENT DOCUMENTS

| 2007/0150157 A1* | 6/2007 | Lee ..................... B60K 31/0066 |
| | | 701/93 |
| 2009/0187322 A1* | 7/2009 | Yasui .................. B60W 40/076 |
| | | 701/70 |

(Continued)

FOREIGN PATENT DOCUMENTS

| EP | 2082936 A2 | 7/2009 |
| JP | H10269499 | * 10/1998 |
| WO | 2007070160 A2 | 6/2007 |

OTHER PUBLICATIONS

Apr. 25, 2018 European Search Report issue on International Application No. EP17199502.

*Primary Examiner* — Peter D Nolan
*Assistant Examiner* — Ashley L Redhead, Jr.
(74) *Attorney, Agent, or Firm* — Clements Bernard Walker; Christopher L. Bernard

(57) ABSTRACT

Method for controlling a vehicle, comprising: identifying an upcoming curve and determining its properties; determining current vehicle speed, $v_v$, estimating friction, $\mu_e$, between a tire of the vehicle and the road; estimating maximum allowable vehicle speed, $v_{max\_e}$, when entering the curve based on the properties, speed and friction; if the current vehicle speed is higher than the estimated maximum allowable vehicle speed, determining that a friction measurement is required; if distance, $d_v$, between the vehicle and a curve entrance is higher than a predetermined threshold distance, $d_T$, and if a braking action is detected, performing a friction measurement during the braking action to determine current friction, $\mu_c$; if a distance between the vehicle and the curve entrance is lower than the predetermined threshold distance, performing a friction measurement to determine a current friction; and determining a maximum allowable vehicle speed $v_{max\_d}$ based on the curve radius, speed and friction.

15 Claims, 3 Drawing Sheets

(51) Int. Cl.
*B60K 31/00* (2006.01)
*B60K 31/18* (2006.01)
*B60W 30/14* (2006.01)

(52) U.S. Cl.
CPC ......... *B60W 30/146* (2013.01); *B60W 10/184* (2013.01); *B60W 2552/20* (2020.02); *B60W 2552/30* (2020.02); *B60W 2552/40* (2020.02)

(58) Field of Classification Search
CPC .. B60W 10/184; B60K 31/0066; B60K 31/18
See application file for complete search history.

(56) References Cited

U.S. PATENT DOCUMENTS

| | | | |
|---|---|---|---|
| 2010/0131165 A1* | 5/2010 | Salman | B60T 8/172 701/70 |
| 2017/0021812 A1 | 1/2017 | Sugano et al. | |
| 2017/0080942 A1 | 3/2017 | Nakada | |

* cited by examiner

METHOD AND SYSTEM FOR CONTROLLING A VEHICLE TIRE-TO-ROAD FRICTION ESTIMATION

CROSS-REFERENCE TO RELATED APPLICATION

The present patent application/patent claims the benefit of priority of co-pending European Patent Application No. 17199502.0, filed on Nov. 1, 2017, and entitled "METHOD AND SYSTEM FOR CONTROLLING A VEHICLE TIRE-TO-ROAD FRICTION ESTIMATION," the contents of which are incorporated in full by reference herein.

FIELD OF THE INVENTION

The present invention relates to a method and system for controlling a vehicle. In particular, the invention relates to a method and system for determining a tire-to-road friction ahead of an upcoming curve.

BACKGROUND OF THE INVENTION

Both autonomous vehicles and human drivers need to adapt the speed before entering curves to be able to stay on the road. The maximum speed with which a curve can be entered is primarily determined by the tire-to-road friction and the radius of the path that the car will take.

For autonomous vehicles it is assumed that knowledge of friction is particularly important to guarantee to not departure the road. Large friction uncertainty means that vehicle speed must be lower and maybe too low for driver acceptance. The radius on the path can be estimated using e.g. on board cameras or map information, where curve cutting behaviour also can be accounted for. Getting reliable estimates of the tire-to-road friction is commonly known to be more difficult. The easiest way is brake fully and measure the deceleration, but this would be disturbing to the driver and to surrounding road users.

To overcome this problem, several attempts have been made to make nonintrusive measurements of the tire-to-road friction using e.g. forward looking cameras, LIDAR's and accelerometers inside of the wheels.

Recently, a promising new technology for reliably measuring tire-to-road friction without reducing the vehicle speed has been developed, see EP3106360A1. The technology measures the friction by simultaneously braking on the rear axle and accelerating on the front axle. Using this technology, measurements of the tire-to-road friction can be made without reducing the vehicle speed. However, the driver and passengers may possibly notice the measurements through the sound of the braking/propulsion system. The vehicle may also appear to "sit" on its rear axle when the measurement is performed, as braking on the rear axle and accelerating on the front axle temporarily will extend the vehicle slightly. Moreover, if the measurements are performed frequently, they will have a negative effect on the fuel consumption. Hence, there is a need to minimize the number of measurements while still providing a measure of the tire-to-road friction with sufficient confidence to assist the driver and autonomous vehicle to adapt the speed to be able to stay on the road.

SUMMARY

In view of above-mentioned and other drawbacks of the prior art, it is an object of the present invention to provide a method for controlling a vehicle to perform a friction measurement only when required.

According to a first aspect of the invention, the object is achieved by a method for controlling a vehicle traveling on a road. The method comprises: identifying an upcoming curve and determining properties of the curve; determining a current vehicle speed; estimating a friction between a tire of the vehicle and the road; estimating a maximum allowable vehicle speed when entering the curve based on the curve properties, vehicle speed and estimated friction; if the current vehicle speed is higher than the estimated maximum allowable vehicle speed, determining that a friction measurement is required, wherein the friction measurement requires braking the vehicle; if a distance between the vehicle and a curve entrance is higher than a predetermined threshold distance and if a braking action is detected, performing a friction measurement during the braking action to determine a current friction; if a distance between the vehicle and a curve entrance is lower than a predetermined threshold distance, performing a friction measurement to determine a current friction; and determining a maximum allowable vehicle speed based on the curve radius, vehicle speed and current friction.

In the present method, the friction measurement technology described in EP3106360A1 can be used to determine a tire-to-road friction. The technology measures the friction by simultaneously braking on the rear axle and accelerating on the front axle. Thereby, the friction measurement does not involve braking of the vehicle as such, i.e. it does not involve reducing the speed of the vehicle. However, during normal driving, the driver may still notice that a friction measurement is performed. Thereby, by performing a friction measurement during braking if possible, the friction measurement can be performed in a non-obtrusive manner without the driver noticing. However, it should be noted that other types of friction measurement technologies also can be used.

Accordingly, present invention is based on the realization that it is not always required to perform a friction measurement when approaching a curve, and that it in many situations is possible to perform the friction measurement during normal driving of the vehicle if a friction measurement is required. For example, many drivers will slow down enough ahead of a curve such that a friction measurement can be performed during driver initiated braking. Unless the friction measurement is performed during driver initiated braking, a non-braking friction measurement is advantageously employed to minimize the influence on the vehicle experienced by the driver. Hence, unnecessary friction measurements can be avoided, the number of performed friction measurements is minimized, and the driver inconvenience of forced friction measurement is minimized.

Hereby, it can be ensured that a friction value which is as correct as possible is used to determine the maximum allowable vehicle speed when reaching the curve entrance for preventing that the vehicle loses grip in the curve. It is here assumed that the tire-to-road friction in the curve does not differ significantly from the tire-to-road friction before the curve. In other words, the described method is not intended to account for unexpected and transient events influencing the friction properties of the curve, such as oil spills or ice patches. It is also assumed that the speed of the vehicle when entering the curve, i.e. the maximum allowable vehicle speed, can be safely maintained throughout the curve. Moreover, even if the vehicle was to lose the grip in the curve, other vehicle systems are assumed to take control, such as electronic stability control (ESC) systems.

According to one embodiment of the invention, the method may further comprise, if the current vehicle speed is higher than the determined maximum allowable vehicle speed, braking the vehicle so that the vehicle speed when reaching the curve is lower than or equal to the determined maximum allowable vehicle speed. Thereby, automatic braking of the vehicle without the need for driver interaction can be performed to ensure that the vehicle speed is not too high when reaching the curve entrance. Thus, the described method may advantageously be implemented as a safety feature in autonomous or semi-autonomous vehicles.

According to one embodiment of the invention, the method may further comprise, if the current vehicle speed is higher than the maximum allowable vehicle speed, braking the vehicle with a constant deceleration from the current location of the vehicle to the curve entrance so that the vehicle speed is equal to or lower than the determined maximum allowable vehicle speed when the vehicle reaches the curve entrance. By braking with a constant deceleration, a smooth and comfortable braking experience is achieved.

According to one embodiment of the invention the method may further comprise, if the current vehicle speed is higher than the determined maximum allowable vehicle speed, alerting the driver, indicating that there is a risk of leaving the road unless the vehicle speed is reduced to the determined maximum allowable vehicle speed. Thereby, the method is advantageously used also in vehicles without self-driving functionality to alert the driver if the vehicle speed is above the determined maximum allowable sped. The alert may be in the form of a visible or audible indication, or a combination thereof. The alert is preferably provided in good time before braking is required so that a driver has time to safely reduce the vehicle speed as required. It can be assumed that a driver need more time, i.e. a longer distance, to safely reduce the vehicle speed compared to an automated system. The predetermined threshold distance to the curve entrance may thus be set to be higher where the method is implemented in a vehicle where it is assumed that the driver is intended to control the vehicle speed compared to in an autonomous vehicle.

According to one embodiment of the invention, the predetermined threshold distance is based on a distance required to reduce the vehicle speed from a current speed to the estimated maximum allowable vehicle speed when entering the curve. The threshold distance may thus be based on the vehicle speed, the estimated friction, and the vehicle braking capabilities. The threshold distance may also be set so that it is possible to brake the vehicle in a manner which is comfortable to the vehicle occupants since it may not be desirable to apply the highest possible braking force. The threshold distance may also be set differently in an autonomous vehicle compared to in a driver operated vehicle for reasons discussed above.

According to one embodiment of the invention, estimating a friction between a tire of the vehicle and the road may comprise acquiring a previously measured friction value for the curve, and estimating the friction to be lower than the previously measured friction. A previously measured friction value may for example be available in the vehicle if the vehicle has previously traveled through the curve under similar road conditions. It is also possible to acquire a previously measured friction value from a remote location such as a cloud server where measured friction values from different vehicles and under various road conditions may be stored. The friction estimation may also take current local weather information into account, for example temperature information and windscreen wiper activity.

According to one embodiment of the invention, estimating a friction between a tire of the vehicle and the road may comprise acquiring a most recently measured friction value for the road on which the vehicle travels, and estimating the friction to be lower than the a most recently measured friction value. In a similar manner as above, the most recently measured friction value may be a friction measured by the vehicle or a value obtained from a remote location. The most recently measured friction value may also be received from another vehicle traveling on the road by utilizing a vehicle-to-vehicle (V2V) communication system. The term "estimating" should thus be interpreted broadly in the present context, where an estimated friction is represented by a friction value which is assumed to be representative of the tire-to-road friction in the curve.

According to one embodiment of the invention, an estimated friction is preferably at least two standard deviations lower than an expected friction. It can thereby be determined that the estimated friction value is lower than an expected average value with 95% certainty. The expected value may be based on any of the previously discussed measured friction values. It is of course also possible to use an estimated friction value which is even lower, and the difference between the estimated friction value and an expected value may be at least partially based on external factors such as road and weather conditions.

According to one embodiment of the invention, determining properties of the curve may comprise determining a curve radius. Furthermore, determining properties of the curve may comprise determining a curve shape, a road width, a lane width and a road camber. It is in general desirable to have as much information as possible describing the curve to be able to accurately estimate a maximum allowable vehicle speed through the curve, based on the current friction. The curve properties may be stored in the vehicle or be acquired from a remote server e.g. using a cloud communication infrastructure. It is also possible to determine curve properties using only in-vehicle sensors such as cameras, radar/LIDAR and the like. The curve radius can for example be estimated using only information acquired by an on-board camera. Accordingly, the properties of the curve may include any parameter describing the curve which can be used to estimate a maximum allowable vehicle speed when entering the curve.

According to one embodiment of the invention, the method may further comprise estimating a vehicle path through the curve based on the curve properties. Thereby, the vehicle speed can be adapted to an estimated and preferably optimized path through the curve, where the path can be refined depending on how much information describing the curve properties is available. A path through the curve may for example include cutting the curve so that the vehicle is not always in the middle of the lane. This may allow the vehicle to travel through the curve in a manner which is more similar to how a driver would drive through the curve, thereby providing a more familiar user experience.

According to one embodiment of the invention, determining properties of the curve may comprise acquiring information from a previously established map such as a map in a navigation system of the vehicle.

According to a second aspect of the invention, the object is achieved by a vehicle control system comprising a vehicle control unit configured to: identify an upcoming curve and determining properties of the curve; determine a current vehicle speed; estimate a friction between a tire of the vehicle and the road; estimate a maximum allowable vehicle speed when entering the curve based on the curve properties, vehicle speed and estimated friction; if the current vehicle speed is higher than the estimated maximum allowable vehicle speed, determining that a friction measurement is required; if a distance between the vehicle and a curve entrance is higher than a predetermined threshold distance and if a braking action is detected, performing a friction measurement during the braking action to determine a current friction; if a distance between the vehicle and a curve entrance is lower than a predetermined threshold distance, performing a friction measurement to determine a current friction; and determine a maximum allowable vehicle speed based on the curve radius, vehicle speed and current friction.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

Figure 1:
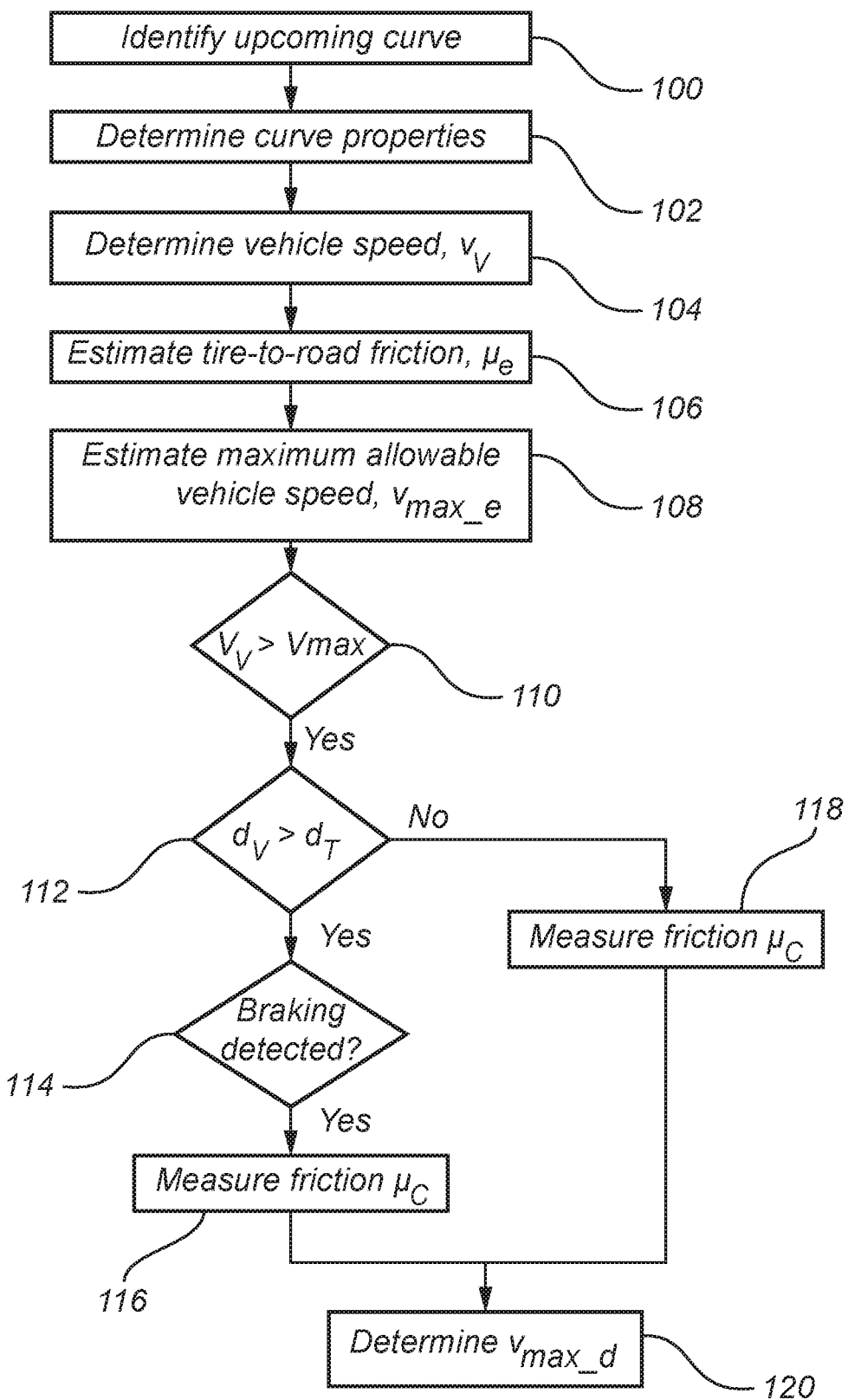
FIG. 1 is a flow chart outlining the general steps of a method according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 2:
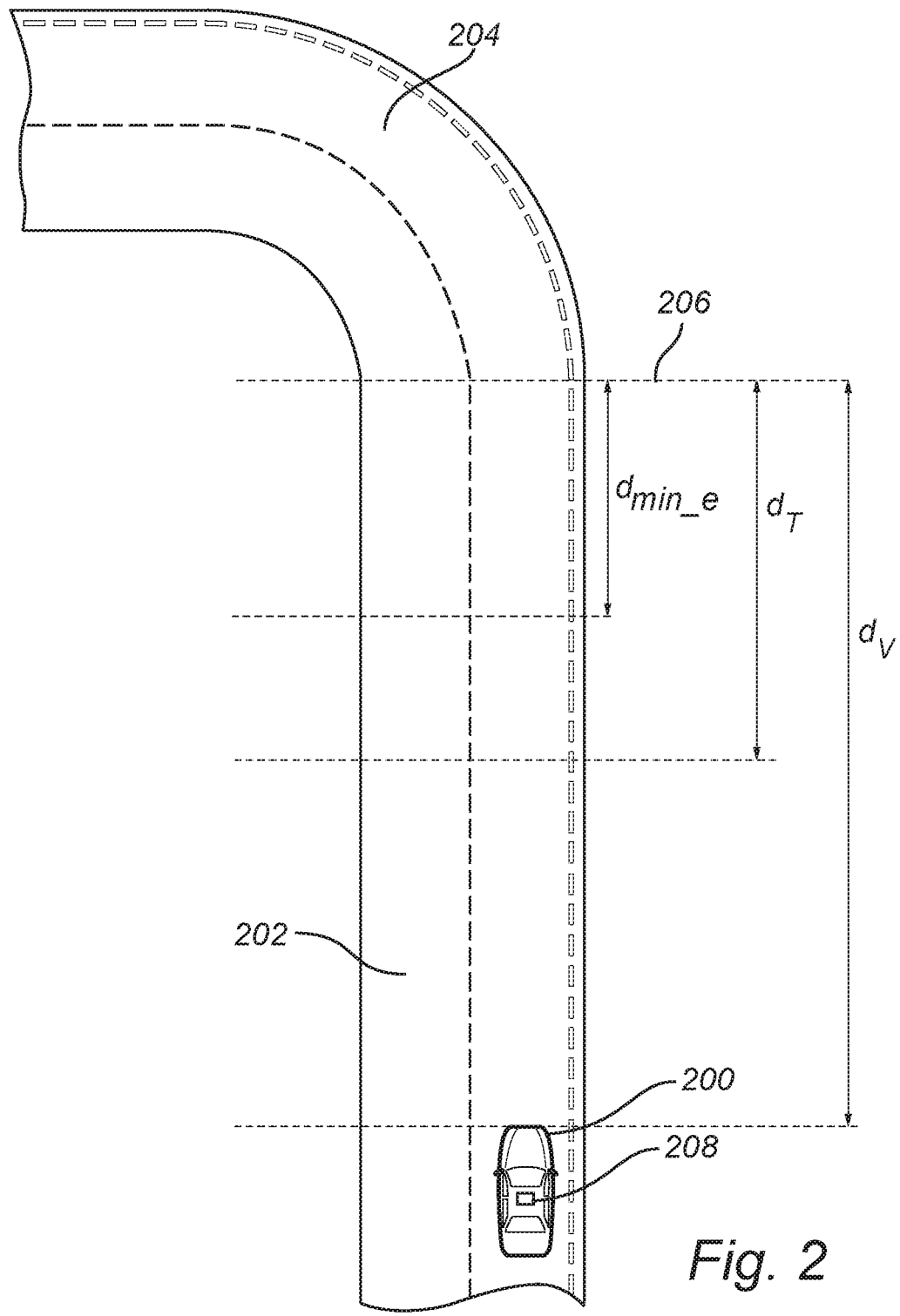
FIG. 2 schematically illustrates the method according to an embodiment of the invention performed by a vehicle.

FIG. 1 is a flow chart outlining the general steps of a method of controlling a vehicle 200 according to an embodiment of the invention; and the method will be described with further reference to FIG. 2 schematically illustrating the method performed by a vehicle 200.

The method is applied when a vehicle is travelling on a road 202 and approaching a curve 204 in the road 202. In particular, the method is aimed at determining if and where it is necessary to perform a friction measurement, to thereby determine a maximum allowable vehicle speed in order for the vehicle to be able to travel through the curve 204 without losing grip.

The following notation will be used in the description of the method:

$v_v$=current vehicle speed
$\mu_e$=estimated tire-to-road friction
$v_{max\_e}$=estimated maximum allowable vehicle speed
$d_v$=distance from vehicle to curve entrance $d_T$=threshold distance
$\mu_c$=current (measured) tire-to-road friction
$v_{max\_d}$=determined maximum allowable vehicle speed
R=curve radius
g=gravitational constant
$d_{min\_e}$=estimated minimum braking distance
$a_{max\_e}$=estimated maximum deceleration The first step of the method involves identifying 100 an upcoming curve 204 and determining 102 properties of the curve. The curve information can for example be acquired from an in-vehicle navigation system or from a remote server as described earlier. A straightforward manner of determining the properties of a curve may be to approximate the curve as having a fixed radius R throughout the curve. However, the curve properties preferably comprise additional information describing a curve shape, a road width, a lane width and a road camber. Moreover, the method can for example be further refined to account for that most roads and vehicle trajectories are shaped as clothoids and not straights and circles. But for the sake of simplicity, the present description use a simple description of the road shape to describe the core ideas of the invention.

Once the curve is identified and curve properties are determined, the current vehicle speed $v_v$ is determined 104 and a friction value $\mu_e$ for the curve is estimated 106. The friction value is deliberately underestimated in relation to an expected friction so that the probability that the actual friction is lower than the estimated friction is very low.

When the curve radius R, vehicle speed $v_v$ and estimated friction $\mu_e$ is known, an estimated maximum allowable vehicle speed $v_{max\_e}$ can be estimated 108 as $$v_{max\_e} = \sqrt{\mu_e g R}.$$

Due to the estimated friction $\mu_e$, assuming that the current vehicle speed $v_v$ is higher than the estimated maximum allowable vehicle speed $v_{max\_e}$, there is also a limitation on an estimated maximum allowed deceleration $a_{max\_e}$ of the vehicle before the curve. The estimated maximum allowed deceleration $a_{max\_e}$ can be determined as $$a_{max\_e} = -\mu_e g.$$

The maximum allowed deceleration $a_{max\_e}$ in turn determines a minimum distance from the curve $d_{min\_e}$ at which braking must be initiated to reach the maximum allowed vehicle speed $v_{max\_e}$ before reaching the curve entrance 206, where the minimum distance from the curve $d_{min\_e}$ is determined as $$d_{min\_e} = \frac{v_c^2 - v_{min\_e}^2}{2\mu_e g}.$$

Accordingly, if the vehicle speed $v_v$ is higher than the maximum allowable vehicle speed $v_{max\_e}$, braking of the vehicle must begin at the latest at a distance from the curve entrance corresponding to the estimated minimum distance $d_{min\_e}$.

Thereby, if the current vehicle speed $v_v$ is higher than the estimated maximum allowable vehicle speed $v_{max\_e}$, it is determined 112 that a friction measurement is required. The details describing how a friction measurement can be performed by simultaneously braking on the rear axle and accelerating on the front axle is described in detail in EP3106360A1, hereby incorporated by reference, and will not be discussed in detail in the present disclosure. However, it should be noted that the described method involves measuring the friction without changing the vehicle speed. Accordingly, the braking of the rear axle, which is counteracted by an acceleration of the front axle, does not result in changing the vehicle speed. The cited method may be referred to as a non-braking friction measurement method. This is in contrast to previously known methods involving braking of the vehicle. In addition to the above referenced method, it is also possible to use other non-braking friction measurement methods, such as an optical measurement of the road properties.

Next, if the distance $d_v$ between the vehicle 200 and the curve entrance is higher than a predetermined threshold distance $d_T$ and if a braking action is detected, a friction measurement is performed 116 during the braking action to determine a current friction $\mu_c$. The predetermined threshold distance $d_T$ is set to be higher than the estimated minimum distance $d_{min\_e}$ so that there is sufficient time to perform a friction measurement. The amount by which the threshold distance exceeds the minimum distance $d_{min\_e}$ may for example be based on the current vehicle speed $v_v$, the estimated friction $\mu_e$ and the estimated time/distance required for performing the friction measurement. A braking action of the vehicle sufficiently long for performing a braking friction measurement may for example be in the range of 1-2 seconds.

Accordingly, if the vehicle 200 is at a safe distance form the curve entrance 206 and if the driver brakes the vehicle, a friction measurement is performed during the diver initiated braking. Thereby, the current friction is known and there is no need for an additional friction measurement. If no braking action is detected, the distance from the vehicle 200 to the curve 204 will eventually be less than the threshold distance $d_T$.

Next, if the current distance $d_v$ between the vehicle 200 and the curve entrance 206 is lower than the predetermined threshold distance $d_T$, and no friction measurement has been performed since the curve 204 was identified, a friction measurement is performed 118 to determine a current tire-to-road friction $\mu_c$. At minimum, the threshold distance $d_T$ is the estimated minimum braking distance $d_{min\_e}$ plus the distance required for performing the friction measurement.

Based on the determined, i.e. measured, current tire-to-road friction $\mu_c$ a maximum allowable vehicle speed $v_{max\_d}$ can be determined 120 based on the curve radius, vehicle speed and current friction as.

$$v_{max\_d} = \sqrt{\mu_c g R}.$$

Thereby a more informed determination of the maximum allowable vehicle speed $v_{max\_d}$ is performed and if the current vehicle speed is higher than the determined maximum allowable vehicle speed $v_{max\_d}$, the vehicle is braked so that the vehicle speed when reaching the curve is lower than or equal to the determined maximum allowable vehicle speed $v_{max\_d}$. The vehicle 200 may be braked automatically or by driver initiated braking. In a non-automated system, the safety margins are advantageously increased such that the driver both has time to react and to perform the required braking in a safe manner. In other words, the threshold distance $d_T$ is preferably higher in a non-automated system.

The vehicle control system 300 comprises a control unit 208 configured control the vehicle to perform the described steps of the method. The control unit 208 may include a microprocessor, microcontroller, programmable digital signal processor or another programmable device. The control unit 208 may also, or instead, include an application specific integrated circuit, a programmable gate array or programmable array logic, a programmable logic device, or a digital signal processor. Where the control unit 208 includes a programmable device such as the microprocessor, microcontroller or programmable digital signal processor mentioned above, the processor may further include computer executable code that controls operation of the programmable device.

Moreover, the control unit 208 may be embodied by one or more control units, where each control unit may be either a general purpose control unit or a dedicated control unit for performing a specific function.

Figure 3:
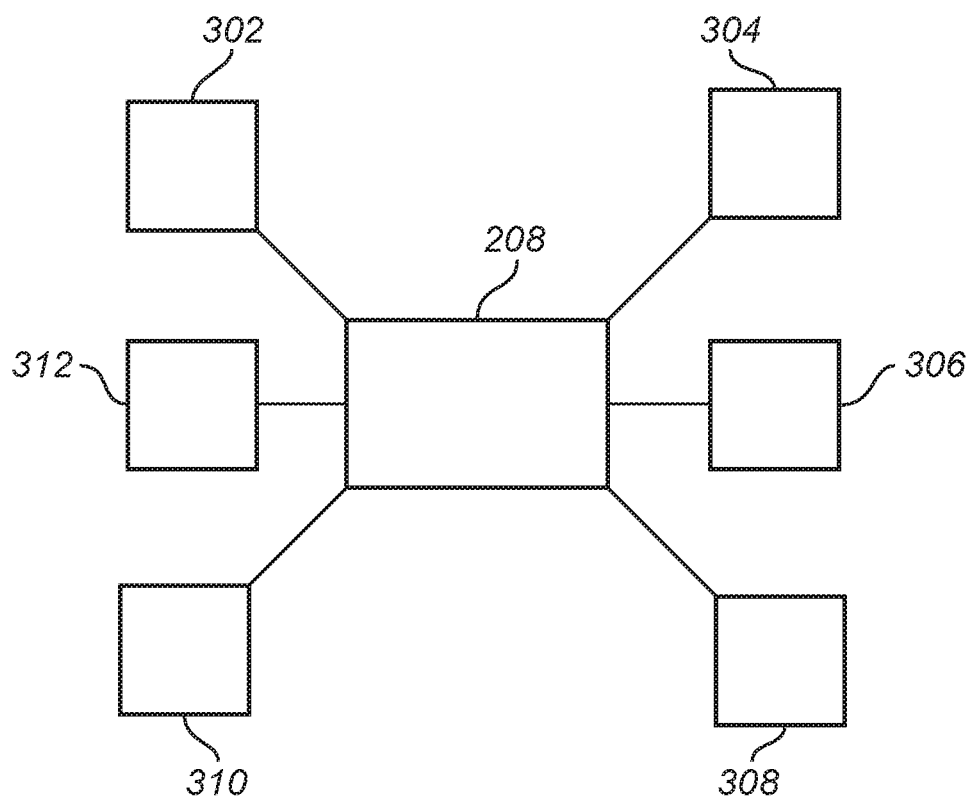
FIG. 3 schematically illustrates a control system according to an embodiment of the invention.

FIG. 3 schematically illustrates a control system 300 where the control unit is connected to the various subsystems responsible for performing the various functions of the method.

As illustrated in FIG. 3, the control system 300 comprises an environmental sensor unit 302 which uses e.g. GPS, camera, radar or the like to determine the vehicle position, a motion planner 304 which performs strategic and tactic motion planning, e.g. determines an acceleration/deceleration profile. The control system 300 further comprises a vehicle state estimator 306 which determines the motion states of the vehicle, e.g. vehicle speed over ground and tire-to-road friction, a friction measurement monitor 308 which determines when to start the a friction measurement, a vehicle motion controller 310 which receives motion requests and outputs requests to actuators e.g. powertrain and brakes to execute the motion requests, and finally a friction measurement executer 312 which determines actuation, e.g. wheel torques, to perform a friction measurement.

The present description is based on a simplified model of the curve and it should be noted that it is further possible to modify the described method and system to control the vehicle to have one vehicle speed when entering the curve, and to modify the vehicle speed while in the curve. This may for example be desirable for curves having a complex shape deviating from a simple arc, for long curves or for multiple consecutive curves.

Accordingly, the described method is intended to maximize the probability that the vehicle will be able to stay on the road under the assumption that the friction in the curve is not significantly lower than the friction just before the curve, given the current speed of the vehicle, the shape of the forward roadway and a priori knowledge of the minimum available tire-to-road friction.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling a vehicle traveling on a road, the method comprising:
   identifying an upcoming curve and determining properties of the curve;
   determining a current vehicle speed, $v_v$;

estimating a friction, $\mu_e$, between a tire of the vehicle and the road;

estimating a maximum allowable vehicle speed, $v_{max\_e}$, when entering the curve based on the curve properties, vehicle speed and estimated friction;

if the current vehicle speed is higher than the estimated maximum allowable vehicle speed, determining that a friction measurement is required;

if a distance, $d_v$, between the vehicle and a curve entrance is higher than a predetermined threshold distance, $d_T$, and if a braking action is detected, performing a friction measurement during the braking action to determine a current friction, $\mu_c$;

if a distance between the vehicle and the curve entrance is lower than the predetermined threshold distance, performing a friction measurement to determine a current friction; and determining a maximum allowable vehicle speed, $v_{max\_d}$, based on the curve radius, vehicle speed and current friction.

2. The method according to claim 1, further comprising, if the current vehicle speed is higher than the determined maximum allowable vehicle speed, braking the vehicle so that the vehicle speed when reaching the curve is lower than or equal to the determined maximum allowable vehicle speed.

3. The method according to claim 1, further comprising, if the current vehicle speed is higher than the maximum allowable vehicle speed, braking the vehicle with a constant deceleration from the current location of the vehicle to the curve entrance so that the vehicle speed is equal to or lower than the determined maximum allowable vehicle speed when the vehicle reaches the curve entrance.

4. The method according to claim 1, further comprising, if the current vehicle speed is higher than the determined maximum allowable vehicle speed, alerting the driver, indicating that there is a risk of leaving the road unless the vehicle speed is reduced to the determined maximum allowable vehicle speed.

5. The method according to claim 1, wherein the predetermined threshold distance is based on a distance required to reduce the vehicle speed from the current speed to the estimated maximum allowable vehicle speed when entering the curve.

6. The method according to claim 1, wherein estimating a friction between a tire of the vehicle and the road comprises acquiring a previously measured friction value for the curve, and estimating the friction to be lower than the previously measured friction.

7. The method according to claim 1, wherein estimating a friction between a tire of the vehicle and the road comprises acquiring a most recently measured friction value for the road on which the vehicle travels, and estimating the friction to be lower than the a most recently measured friction value.

8. The method according to claim 1, wherein an estimated friction is at least two standard deviations lower than an expected friction.

9. The method according to claim 1, wherein determining properties of the curve comprises determining a curve radius.

10. The method according to claim 1, wherein determining properties of the curve comprises determining a curve shape.

11. The method according to claim 1, wherein determining properties of the curve comprises determining at least one of a road width, a lane width and a road camber.

12. The method according to claim 1, wherein determining properties of the curve comprises acquiring curve properties from a remote server.

13. The method according to claim 1, further comprising estimating a vehicle path through the curve based on the curve properties.

14. The method according to claim 1, wherein determining properties of the curve comprises acquiring information from a previously established map.

15. A vehicle control system comprising a vehicle control unit configured to:

identify an upcoming curve and determine properties of the curve;

determine a current vehicle speed, $v_v$;

estimate a friction, $\mu_e$, between a tire of the vehicle and the road;

estimate a maximum allowable vehicle speed, $v_{max\_e}$, when entering the curve based on the curve properties, vehicle speed and estimated friction;

if the current vehicle speed is higher than the estimated maximum allowable vehicle speed, determine that a friction measurement is required;

if a distance, $d_v$, between the vehicle and a curve entrance is higher than a predetermined threshold distance, $d_r$, and if a braking action is detected, performing a friction measurement during the braking action to determine a current friction $\mu_c$;

if a distance between the vehicle and the curve entrance is lower than the predetermined threshold distance, performing a friction measurement to determine a current friction; and determine a maximum allowable vehicle speed $v_{max\_d}$ based on the curve radius, vehicle speed and current friction.

* * * * *